United States Patent

[11] 3,592,419

[72] Inventor Ralph E. Hantzsch
Los Alamitos, Calif.
[21] Appl. No. 883,709
[22] Filed Dec. 10, 1969
[45] Patented July 13, 1971
[73] Assignee The United States of America as represented by the Secretary of the Air Force

[54] ROCKET TWO-WAY CENTERING BUNGEE
3 Claims, 10 Drawing Figs.

[52] U.S. Cl. ................................................. 244/122
[51] Int. Cl. ................................................. B64d 25/10
[50] Field of Search ................................. 244/122, 141

[56] References Cited
UNITED STATES PATENTS
3,362,662  1/1968  McIntyre et al. ............. 244/122
3,487,445  12/1969  Gluhareff et al. ............. 244/122

Primary Examiner—Milton Buchler
Assistant Examiner—Carl A. Rutledge
Attorneys—Harry A. Herbert, Jr. and Ruth G. Codier ABSTRACT: Stabilization system for preventing rotation of a pilot seat and its occupant which becomes operative only after ejection and when it is in the air and free from the air or space craft. A linkage system set up between a gyro and the rocket motor duct keeps the direction of rocket thrust aligned with the center of gravity of man and seat. The gyro is sensitive to both clockwise and counterclockwise motion. When a yaw or spinning motion begins to take place the gyro, operating through a linkage system, rotates the rocket duct either clockwise or counterclockwise, as demanded by the gyro, to change the direction of rocket thrust to counteract the spin.

The linkage system comprises a harness or frame secured to the center of the rocket duct system, and two links to connect the gyro to the harness and effect limited rotary movement of the duct system. One of the links has slidable connection to, and operates against the spring of a bungee element.

PATENTED JUL 13 1971  3,592,419

INVENTOR.
RALPH E. HANTZSCH
BY Harry A. Herbert Jr.
   and
ATTORNEYS

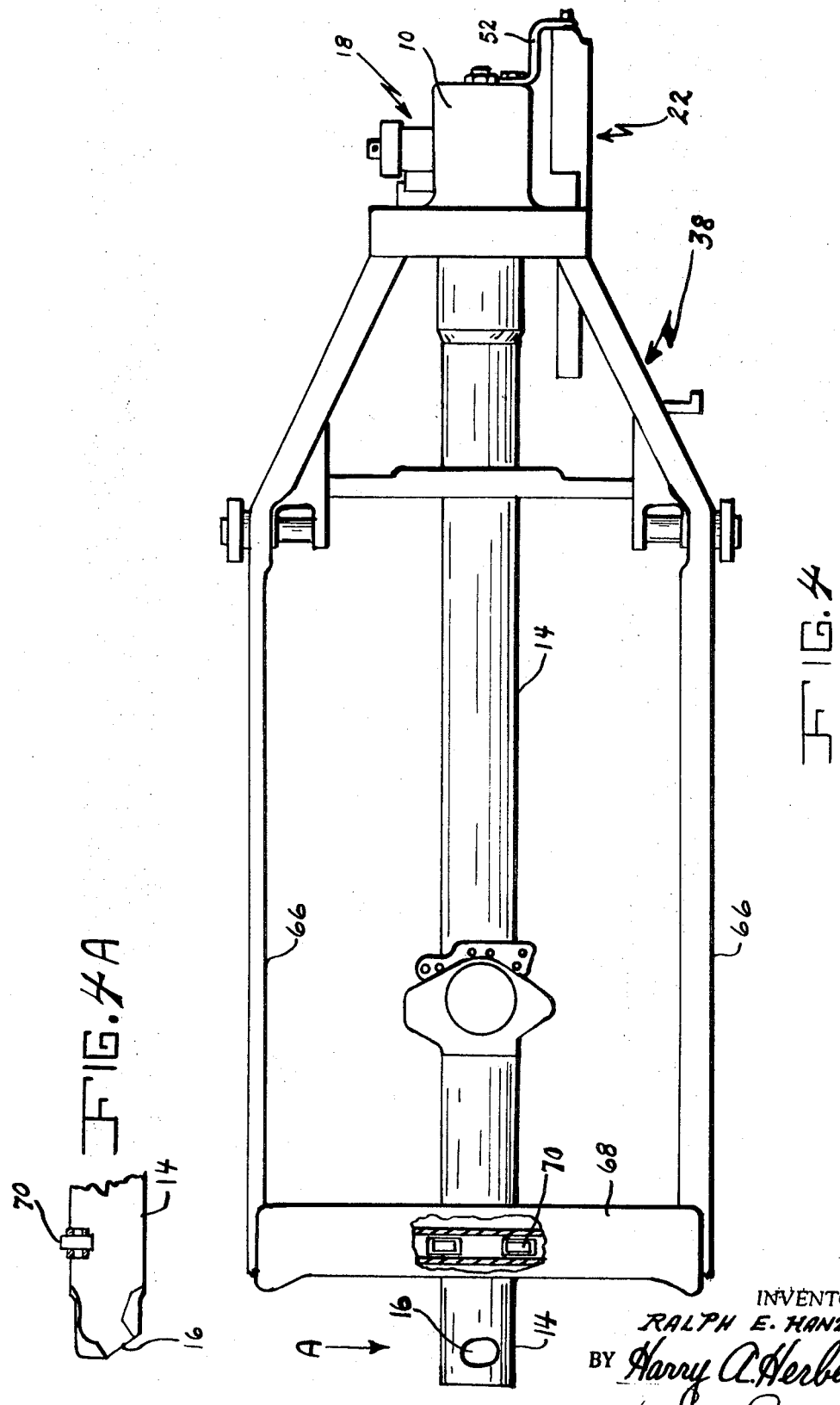

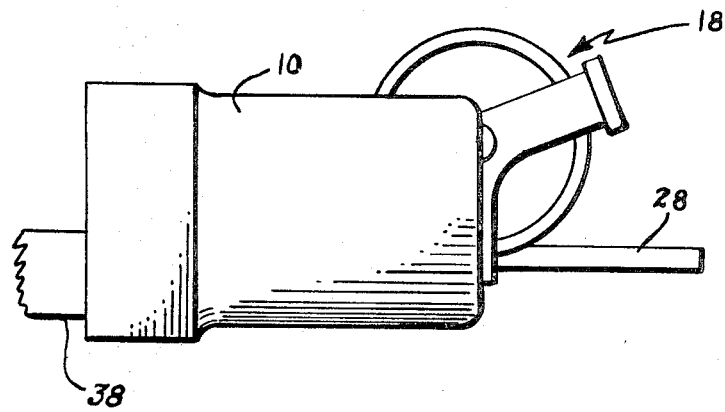
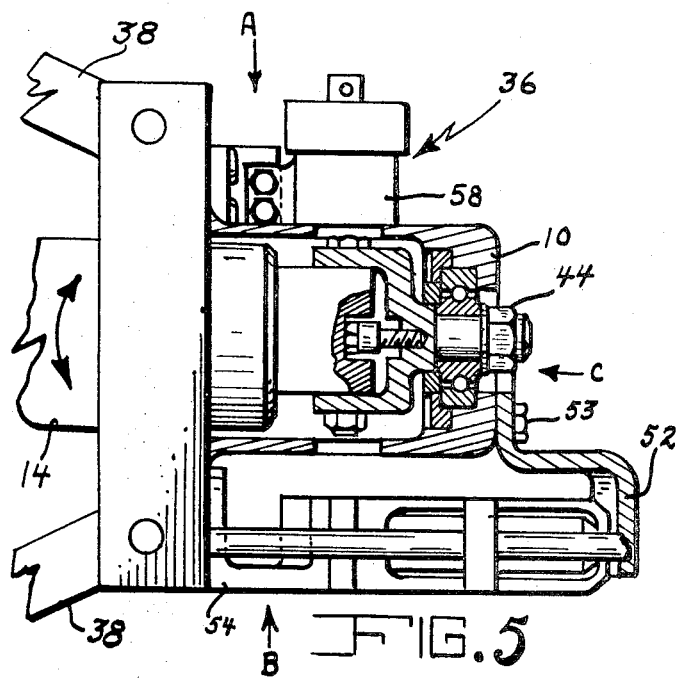
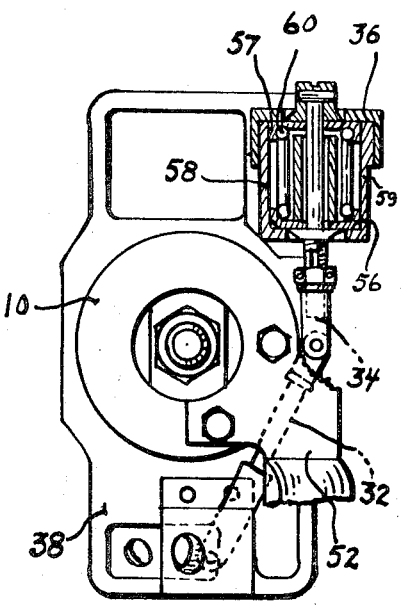
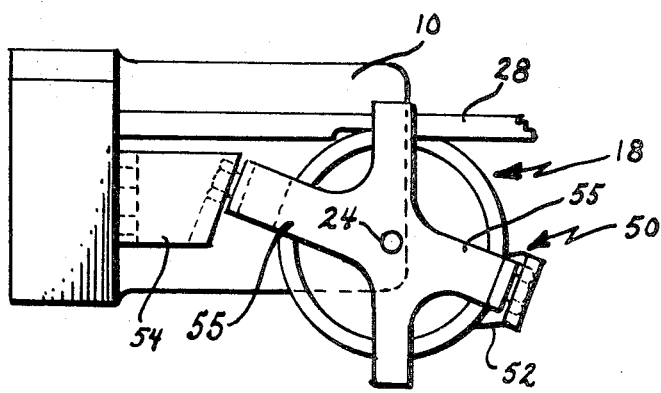

ROCKET TWO-WAY CENTERING BUNGEE

BACKGROUND OF THE INVENTION

The invention relates to a rocket two-way centering bungee, and more particularly to a device for stabilizing a pilot's ejection seat after ejection has taken place and the seat and pilot are clear of the aircraft. One of the major difficulties encountered in this maneuver, is the tendency of the seat to acquire an undesirable rotational torque movement which may redirect the seat and pilot back toward the aircraft.

Many devices have been proposed to prevent such undesirable rotation of pilot and seat and the hazardous conditions it causes. Most of these require some form of connecting means between the seat and aircraft. These devices do not provide a smooth correctional torque, but provide only a series of jerking correctional movements.

SUMMARY OF THE INVENTION

The object of the present invention is the provision of a two-way centering bungee system, integrated into the yaw stabilization system of an air force escape sequence, which does not become functional until the seat has been ejected and is free of the aircraft.

A further object of the invention is the provision of a device which will keep the motor portion of the catapult rocket on center until overcome by the yaw control rate tyro. The rate gyro is mounted in such a manner as to sense rotations, both clockwise and counterclockwise, about an axis perpendicular to the main rocket thrust vector. The rate gyro is connected by linkage through a flexible bungee to a means for effecting limited rotational movement of the rocket motor and, through the rocket motor duct, to effect correction and directional change in the nozzle.

The yaw stabilization system becomes operative after the seat moves up and away from the cockpit tracks following catapult rocket ignition. If the seat begins to yaw as a result of movements induced by rocket centerline offset, aerodynamic loads, or pilot mass offset, a precessional torque is created by the spinning rate gyro. This precessional torque will rotate the main rocket after it has overcome the spring of a two-way bungee element, causing a rocket thrust gravity center offset movement opposing the yaw or pitch. This effectively stops the rotation of the seat.

Stated differently, one of the objects of the invention is the provision of a link system for rotating the rocket thrust duct in response to a yaw sensing gyro.

DESCRIPTION OF THE DRAWINGS

FIG. 4 is a view of the gyro mounting and link-to-duct connection system with portions broken away. This view includes a gyro lock;

FIG. 4A is a schematic view of the rocket nozzle looking in the direction of the arrow A in FIG. 4;

FIG. 5 is a fragmentary view, partly in cross section, of a portion of the stabilizing system shown in FIG. 4, and including the gyro lock;

FIG. 5A is a view of the motor and gyro locking device looking in the direction of the arrow A in FIG. 5;

FIG. 5B is a view of a portion of the device looking in the direction of the arrow B in FIG. 5; and FIG. 5C is a fragmentary view, partly in cross section, looking in the direction of the arrow C in FIG. 5.

DESCRIPTION OF THE PREFERRED EMBODIMENT

Figure 3:
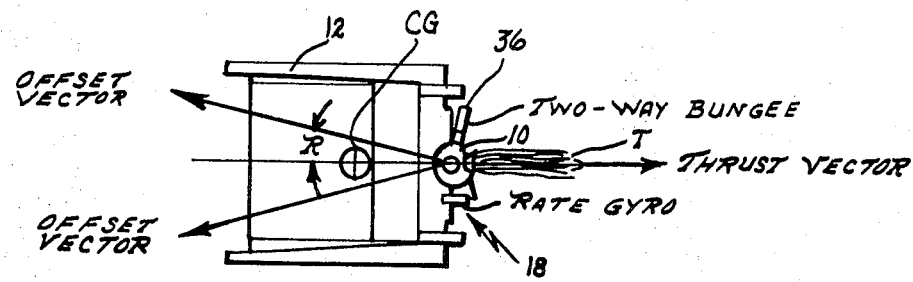
FIGS. 3 and 3A are diagrammatic showings of the vector forces operating in the yaw system vector force.
Figure 3A:
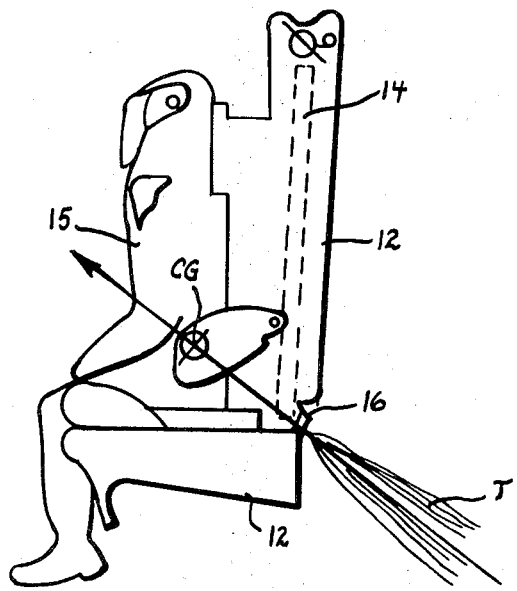
Figure 1:
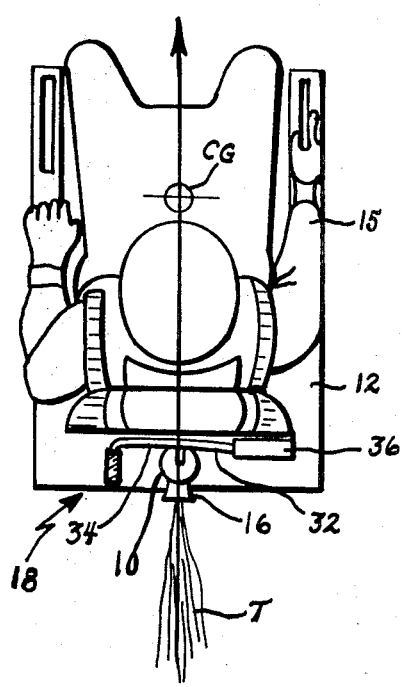
FIG. 1 is a schematic top view of an ejection seat and occupant, showing the general arrangement of elements of the stabilizing device.

Referring to FIGS. 1, 2, 3 and 3A, a motor casing 10 is mounted on the rear of the ejectable seat 12. A rocket duct 14 terminates in a rocket nozzle 16. The duct 14 is capable of limited rotary movement to govern the direction of thrust of the nozzle 16 as indicated by the arrow T, Figures 3 and 3A. As stated above, the extended line T of the direction of thrust goes through the center of gravity CG of seat and occupant until a gyro system indicated, generally by the numeral 18, detects a yaw or spinning movement.

The invention lies in an operable system for transmitting the sensitive movements of the gyro 18 to the rocket duct 14 to rotate the duct 14 and nozzle 16 in response to yaw and spinning motion sensed by the gyro 18.

The gyro system 18 comprises a gimbal 20, a rate gyro 22 pivoted in the gimbal 20 at 24 and provided with teeth 26 which engage a piston rack 28. The gyro 18 is hung in a linking system by means of the gimbal arm 29 and pivot 30.

The link system comprises a pair of links 32 and 34 and a third link 44. A first link 32 has a flexible connection with a bungee element 36. The second link 34 is pivoted to the gyro arm 29 at 30. The bungee element 36 has sliding and flexible connection with the first link 32. At its outer end it is connected to a rigid frame assembly indicated generally by the numeral 38. The links 32 and 34 have pivotal connection at 40 at their inward ends. The pivot 40 is constructed to allow movement of links 32 and 34 in a plane perpendicular to the rocket duct 14 and the axis of the motor casing 10. The third link 44 is pivoted into the link system 32—34 at 40. Its inward end is connected in a rigid manner to the upper center surface of the motor 10, transmitting the gyro movements to the motor 10.

A bar 42 connects the members of the frame 38 and is pivoted at 46 to link 44, so that the link 44 pivots under the bar 42, transmitting the gyro movements, cushioned by the bungee 36, and causing rotary movement of the motor 10, and rocket duct 14.

Figure 2:
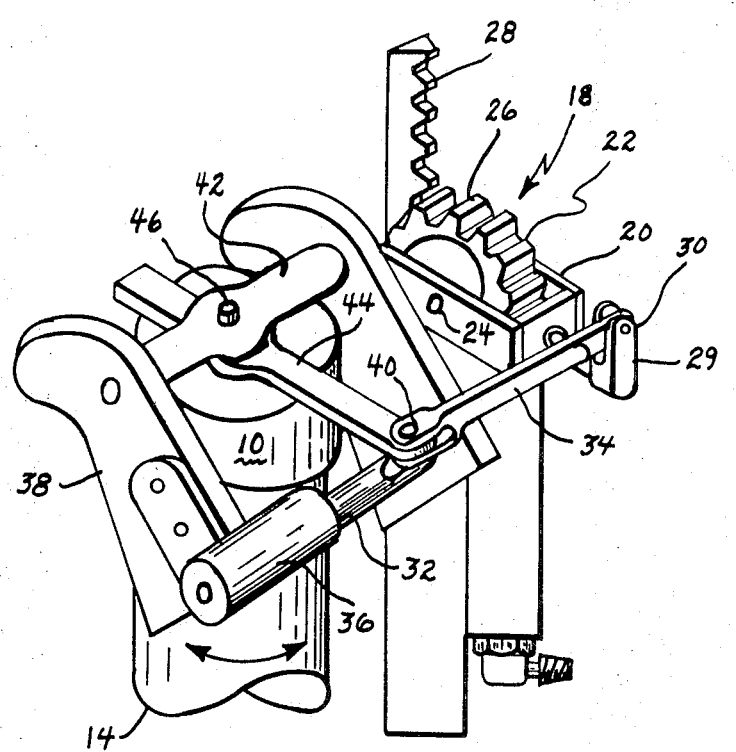
FIG. 2 is a schematic perspective view of the yaw stabilization system.

The motor casing 10, as above mentioned, has limited rotary motion, both clockwise and counterclockwise, as indicated by the arrow A in FIG. 2, in response to required indication by the gyro 18.

FIG. 2 is an exemplary showing of one manner in which the movement received by the linking system 32—34 from the gyro 18 can be transformed into rotary movement of the rocket duct 14 to change rocket nozzle direction.

FIGS. 4, 5, 5A, 5B and 5C show details of the motor and gyro mounting and a locking mechanism 50 for locking the gyro 18.

A frame or harness 38 carries the motor casing 10. A bracket 52 is attached to the motor casing 10 at 53. The bracket 53 and a second bracket 54 are adapted to engage gyro arms 55 to lock the gyro 18 into inoperative positions. Arms 66, elements of the frame 38, attach to a plate 68, stabilizing the whole structure, and bearings 70 allow the duct 14 to rotate within it.

Details of the bungee element 36 are shown in the cross-sectional portion of FIG. 5C. The link 34 is attached to one portion of a pair of cup elements 56 and 57 which are enclosed in the movements of the bungee element 36 is limited by the internal stop 59.

MODE OF OPERATION

The operation of the device will now be apparent. When the seat with its occupant has been ejected and is free of the aircraft, the adjustment of the nozzle is such that a line projecting the line of direction of rocket thrust will pass through the center of gravity of seat and occupant. If a yaw or spinning movement begins to occur, the gyro responds to this movement causing movement of the linkage system 32—34—44 when the bias of the spring or other resilient means in the bungee has been overcome. The lateral movement of the link system, which may be in either direction depending upon the signal received from the gyro, is transferred to rotary motion of the duct 14, clockwise or counterclockwise, again depending upon the signal received. The duct 14 terminates in the rocket nozzle 16. The direction of thrust is governed therefore by the rotation of the duct 14, and in a direction to provide correction of yaw or spin.

Although the invention has been described with reference to a particular embodiment, it will be understood to those skilled in the art that the invention is capable of a variety of alternative embodiments within the spirit and scope of the appended claims.

I claim:

1. A yaw-stabilizing system for preventing spinning of an ejected seat ejected from an air or spacecraft, said system comprising: a rocket motor located at the rear of an ejectable seat, a rocket motor nozzle, a rocket motor duct for conveying the thrust of said motor to said rocket motor nozzle, means for keeping the thrust of said rocket motor aligned with the center of gravity of said seat and occupant, means for altering the direction of thrust of said nozzle around a center both clockwise and counterclockwise and in a plane perpendicular to the direction of the original thrust, for counteracting and preventing yaw movement and spinning of said ejected seat, said means comprising a rate gyro capable of sensing rotation of said seat, a linkage system comprising a first bungee link and a second link, a gimbal element, a rate gyro hung in said gimbal element, a pivotal connection between said gimbal element and one end of said second link, pivotal connection between said first and second links to allow movement of said links in a plane perpendicular to said rocket duct, a bungee element, said first link having flexible connection for sliding movement within said bungee element, and means for transferring the movement of said linking system to rotary movement of said rocket duct to change the direction of thrust of said rocket nozzle.

2. A device as set forth in claim 1 wherein said flexible connection comprises a pair of spring seat elements, one of which is secured to said bungee link and a spring seated in said spring seat elements.

3. In a device as claimed in claim 1 a locking device for locking said gyro in inoperative position.